May 15, 1956 R. A. POWLEY 2,745,935
METHOD FOR ARC WELDING

Filed May 27, 1952 2 Sheets-Sheet 1

INVENTOR.
Richard A. Powley,
BY
Harness and Harris
ATTORNEYS

May 15, 1956  R. A. POWLEY  2,745,935
METHOD FOR ARC WELDING
Filed May 27, 1952  2 Sheets-Sheet 2
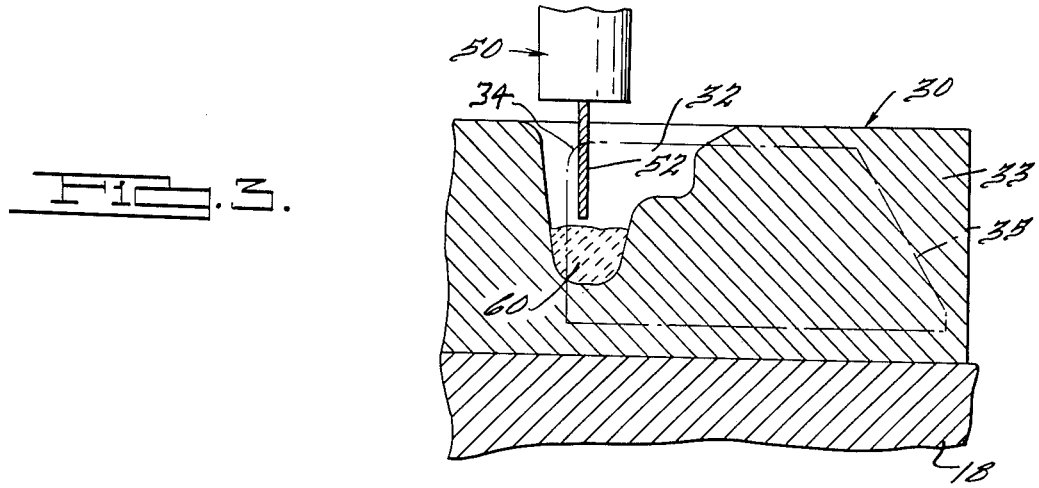
FIG. 3.
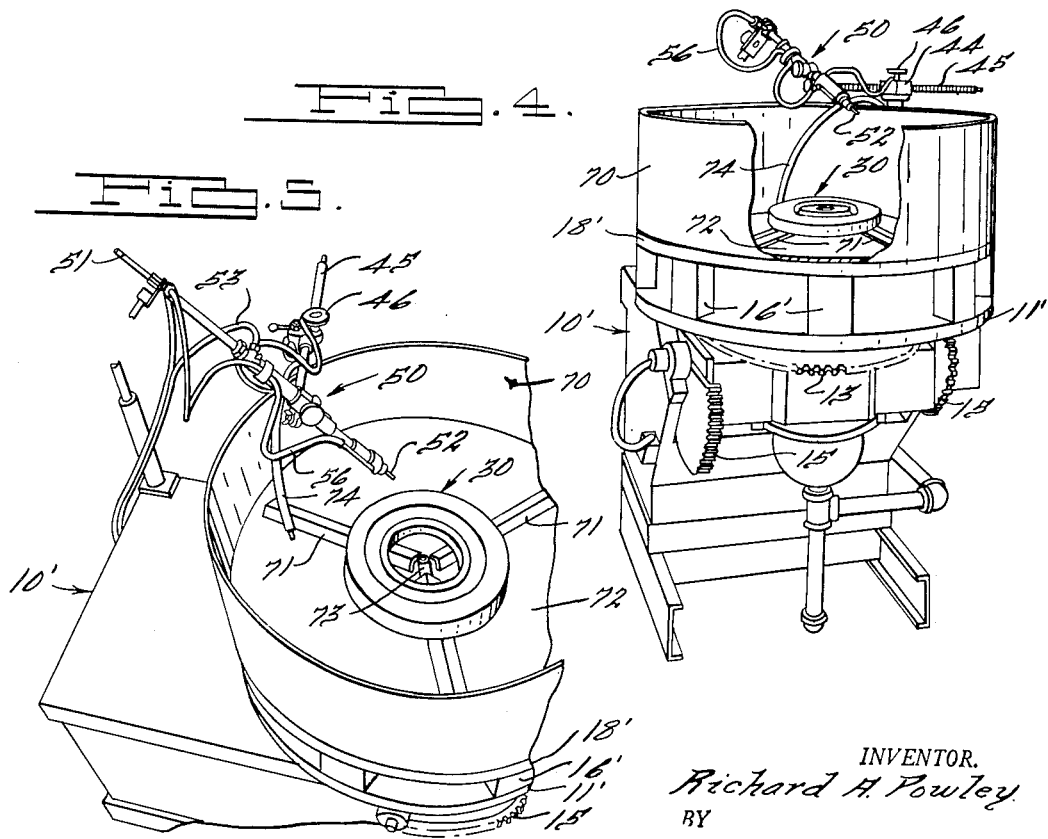
FIG. 4.
FIG. 5.
INVENTOR.
Richard A. Powley
BY
Harness and Harris
ATTORNEYS.

United States Patent Office 2,745,935
Patented May 15, 1956

2,745,935
METHOD FOR ARC WELDING

Richard A. Powley, Birmingham, Mich., assignor, by mesne assignments, to Air Reduction Company, Incorporated, New York, N. Y., a corporation of New York Application May 27, 1952, Serial No. 290,295

2 Claims. (Cl. 219—10)

This invention relates to methods and apparatus for the deposition of metals by welding.

It is a primary object of this invention to provide methods and apparatus whereby fusible metals, and metal alloys, may be readily deposited by arc welding so as to build up metallic bodies with a hard, tough, wear-resistant surface.

It is a further object of this invention to provide a novel means for fabricating and/or reconditioning dies, trackways, bedplates and similar objects that must possess portions with a relatively hard, tough, wear-resistant surface.

It is another object of this invention to provide work holding apparatus for arc welding operations and the like that permits the temperature of the workpiece to be carefully controlled during the welding operation.

It is another object of this invention to provide a temperature controlled, work positioning table that is particularly adapted for supporting workpieces that are to be built up by the welding of filler material thereto.

It is still another purpose of this invention to provide a method of applying a metallic coating to an object by arc welding that involves bringing the object to a predetermined temperature, providing means for maintaining the object at the predetermined temperature, moving the object relative to the welding material at a predetermined rate, and positioning the object during its movement such that the fused welding material is applied thereto in a predetermined manner.

It is a further object of this invention to provide a method of welding material to an object that is immersed in a liquid bath.

Other objects and advantages of this invention will become readily apparent from a reading of the following description and a consideration of the related drawings wherein:

Figure 3 is an enlarged fragmentary, sectional elevation view taken along the line 3—3 of Figure 1;

Figure 4 is a perspective view of a modified form of the invention with portions broken away and shown in section; and Figure 5 is a fragmentary plan view of the machine shown in Fig. 4.

Figure 1:
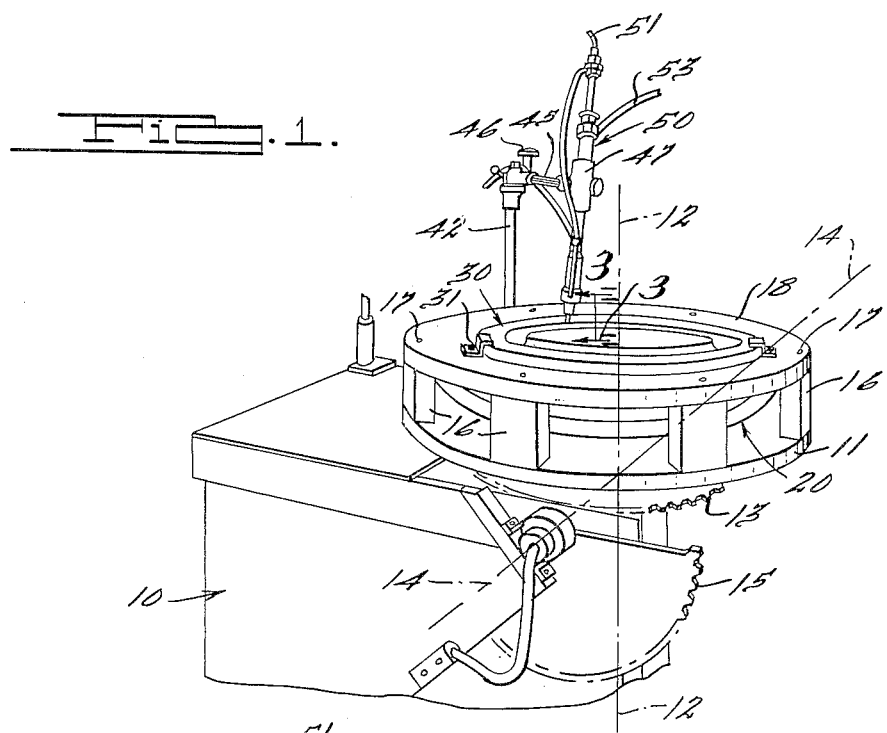
Figure 1 is a perspective view of a work holding unit utilized in applying one of the methods herein disclosed.

In the fabricating of dies and the like, it has been found quite advantageous to build up the working surface of the die by the deposition of a suitable fusible filler material in a preformed cavity in the die after which the die is shaped to final form with portions of the fusible filler material providing the working surface of the die. By such a method of die fabrication, the main body portion of the die can be formed to a rough shape from an inexpensive material and the part of the die that is to provide the working surface is composed of a suitable hard, tough, wear-resistant material.

Aluminum bronze welding wire of known commercial form has been found to be quite suitable for building up dies and the like in accordance with this invention. However, aluminum bronze is not to be considered as the only material that is usable in the application of this invention for the methods and apparatus herein disclosed can also be used for welding with carbon and alloy steels, chromium and nickel alloys, aluminum and alloys thereof, copper and alloys thereof such as Phosphor bronze and aluminum bronze, as well as certain types of magnesium alloys. The general type of welding utilized to apply the above noted metals and alloys to a piece of work in accordance with this invention, is broadly known as gas shielded metal arc welding and this type of welding is described in the U. S. Patent 2,504,868 to Muller et al., dated April 18, 1950. The invention herein described represents an improvement over the invention disclosed in the noted patent.

Looking now at the drawings, 10 represents a positioning table that mounts a movable ring-like, workpiece supporting head 11. The workpiece supporting head 11 is adapted to be rotated about the axis 12—12 by means of the gearing 13 and to be tilted about the axis 14—14 by means of the gearing 15. The gears 13 and 15 are each adapted to be motor driven and suitable means (not shown) are provided to lock either of these gears in a preselected position. Spaced circumferentially about the inner and outer peripheries of the ring-like machine head 11 are a number of spacer blocks 16. Blocks 16 are fixedly mounted on the head 11 by bolts 17. The spacer blocks 16 are adapted to support a workpiece bas disc 18. The base disc 18 is a flat metallic plate that is pierced by a plurality of radially extending slots 19. Disc 18 is held on the spacer blocks 16 by means of the bolts 17 although any other equivalent form of connecting means may be used for this purpose.

Extending between the head 11 and the base disc 18 is a web-like burner element 20. The burner 20 is composed of sections of gas pipe that are supported on the spacer blocks 16. The pipes of the burner 20 are pierced on their upper sides so as to provide flame openings that can readily heat the overlying base disc 18 and any objects supported thereon. The burner 20 has its central portion connected to a gas supply line 25 that includes a suitable form of air mixing valve 26.

The base disc 18 is adapted to support the workpiece 30, which in the instance shown, is a ring-like die. The die 30 is fastened to the base disc 18 by means of the detachable clamp connectors 31. From Figure 3 it will be noted that the die 30 has a channel-like groove 32 formed therein, the purpose of which will become readily apparent from the subsequent description. The body portion 33 of the die 30 may be of cast steel or the like. The channel 32 in die 30 is adapted to be filled with a suitable material such as aluminum bronze to provide the working surface 34 of the die after the die has been shaped to final form. The final form of the die 30 is indicated by the broken lines 35.

This invention, among other things, relates to the method of applying and building up the metal filler material 36 in the die channel cavity 32. It will be noted that the machine 10 mounts a post supporting sleeve 40 having a set screw 41. Telescopically seated in the sleeve 40 is a post 42. The upper end of post 42 carries a rod-supporting sleeve 44 that adjustably receives the rod 45. Clamp 46 provides for the adjustment of the rod 45 in the sleeve 44. The free end of rod 45 carries an adjustable sleeve 47 that receives the tube-like arc welding gun 50. Arc welding gun 50 essentially is a tube that has a welding wire 51 extending therethrough from end to end with the lower end 52 of the wire 51 providing the arc welding tip that is fused and deposited during the welding operation. The wire 51 is adapted to be automatically fed through the gun 50 at a substantially constant rate during the welding operation. The means for passing the wire 51 through the gun 50 is not shown for it forms no part of this invention. A gas supply line 53 is connected to the upper end of the gun 50 so as to pass an inert gas such as argon or helium through the gun 50 during the welding operation. The gas passed through the gun 50 forms a gas envelope for the welding arc and improves the welding operation. The leads of a welding generator set (not shown) are connected by the conductors 56 to the wire 51 that is passed through the gun 50. The die 30 is also connected to the welding generator set (not shown) by suitable conductor means so that a completed welding circuit is established when the welding arc is set up between the wire tip 52 and the die 30 (see Figure 3).

It has been discovered that improved dies, and the like, can be fabricated by using the above described equipment in the manner hereinafter set forth. First the die 30 is centered on the base 18 and fixed in such a position. Next the burner 20 is lit and the base disc 18 and die 30 brought up to a specified temperature. For a cast steel die body to which an aluminum bronze filler material 60 is added, it has been found that bringing the workpiece to a temperature of approximately 650° F. is conducive towards an improved final product. After the workpiece has been brought to the proper temperature for the materials involved, then the welding gun 50 is swung to proper metal welding position. From Figs. 1 and 3 it will be noted that the welding wire tip 52 is aligned with the groove-like cavity 32 in the die 30 so that the fused tip material will be deposited as shown at 60. With the welding gun aligned with the die cavity 32, the welding operation is then started. On initiating the welding operation the gearing 13 is also set in motion and the die workpiece 30 is then rotated beneath the welding gun tip 52 at a predetermined rate. A rotational speed of about 15–20 inches of die per minute has been found to give excellent results with a die of the type shown but obviously this speed will be varied to suit the particular job. With the die rotated at the prescribed speed, the welding wire 51 can be fed through the gun 50 at a speed of about 275 to 300 inches of wire a minute and this will deposit about 2 pounds of filler material a minute if a 3/32 inch welding wire is being used.

For building up a major portion of the die cavity 32 with the filler material 60, the machine head 11 will be maintained in a substantially horizontal position. However, for building up the filler material 60 along certain of the wall portions of the cavity 32, it is advantageous to tilt the head 11 to a position such as that shown in Fig. 2. Tilting the head and workpiece permits the fused metal welding wire 51 to be deposited evenly over the area of the cavity 32 and improves the resulting product. After the cavity 32 has been completely filled with filler material 60, then the die 30 is machined to the final form shown by the broken lines 35 (Fig. 3).

With the die shown, the working surfaces are all of the aluminum bronze alloy filler material that provides a most efficient hard, tough surface having a Brinnell hardness rating of between 200 and 300. Furthermore, not only is it very easy to fabricate a die according to the method described but in addition used dies may be reworked and reconditioned by the same process.

Figure 2:
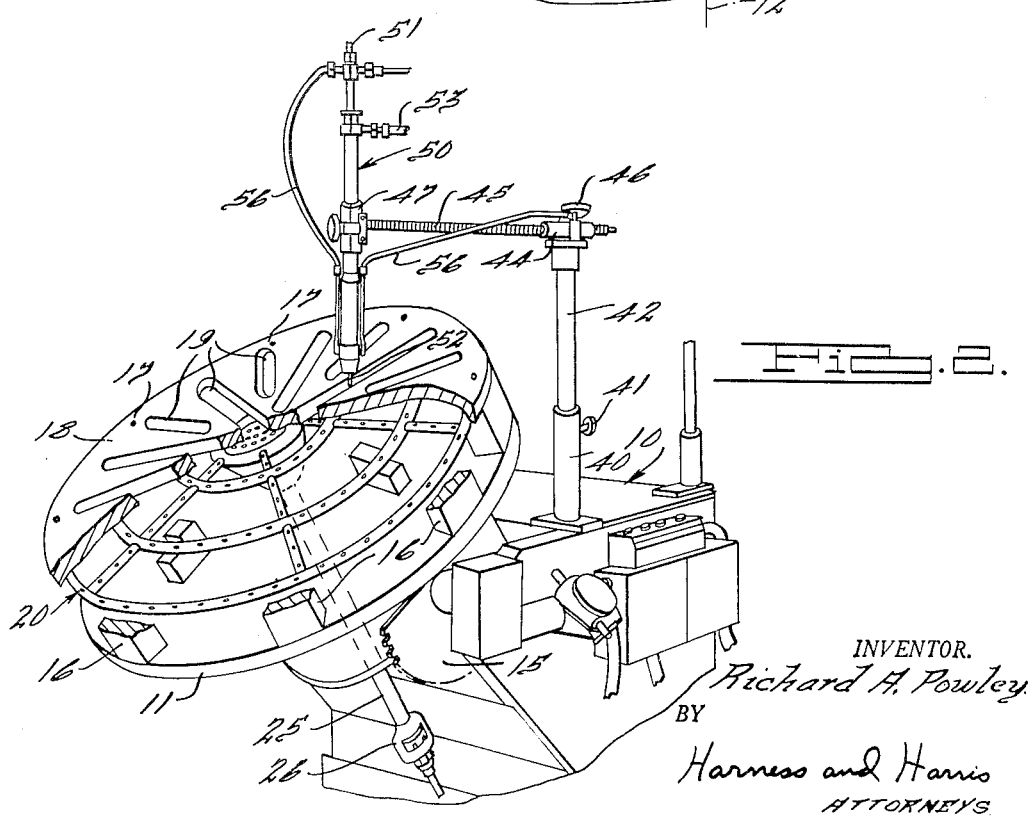
Figure 2 is another perspective view of the unit shown in Figure 1, this view being taken from the opposite side and with the work table tilted and portions thereof broken away and shown in section.

Figs. 1–3 disclose means for controlling the die temperature by the use of the burner 20 whereas Figs. 4 and 5 show a modification of the aforementioned invention wherein the temperature of the die is controlled by a liquid bath instead of a burner. In Figs. 4 and 5 the machine 10' has a rotatable, tiltable head 11' that is substantially identical to the head 11 shown in Figs. 1–3. Mounted on the head 11' by means of the spacer blocks 16' is the ring-like base disc 18'. Machine 10' differs from the machine 10 in that the burner element 20 is omitted and there is substituted therefor the liquid bath tank 70 for controlling the temperature of the die 30 during the welding build-up of the die. The tank 70 that is seated on the base disc 18' comprises a cylindrical cup with radially extending spacer elements 71 positioned across its bottom surface 72. The spacer elements 71 hold the die 30 above the bottom 72 of the tank 70 and permit the liquid in the tank to circulate about all sides of die 30. Piercing the bottom 72 of the tank 70 at the center thereof is a liquid drain pipe 73. Drain pipe 73 can be varied in length by the addition and removal of detachable sections to thereby control the height to which the liquid will fill the tank bottom. A liquid supply line 74 continuously supplies a suitable liquid to the tank interior so that the bottom of the tank will be filled to the top of drain pipe 73 at all times. It has been found that with certain materials the cooling of the die by the circulation of cold water through the tank 70 during the welding build-up of the die produces a very hard filler material having a Brinnell hardness rating of 350 or better.

The build-up of the die 30 shown in Figs. 4 and 5 is done in the same manner as already explained with regard to Figs. 1–3. The welding gun 50 is identical to that shown in Figs. 1–3 and the die 30 is rotated beneath the gun tip 52 until the die cavity has been completely filled with filler material. After build-up of the die cavity the die is then machined to final shape.

While circular dies have been shown it is thought to be obvious that dies of other shapes can be used. For the build-up of bed plate trackways and the like it might be advantageous to reciprocate the trackway supporting elment beneath the welding gun tip or to reciprocate the welding gun tip along the trackway.

Many other uses of the apparatus and methods herein disclosed are thought to be obvious from a reading of the aforementioned description and therefore this invention is not to be limited except as by the claims appended hereto.

I claim:

1. A method of making a die having an exposed working surface of aluminum bronze with a Brinnell hardness rating of at least 300 which comprises forming a die base of cast steel having the general configuration of the finished die and containing a preformed cavity to receive the aluminum bronze of the working surface of the die, circulating a cooling liquid in direct heat exchange relation to said die base, depositing said aluminum bronze in said cavity by an inert gas shielded metal arc welding process using a bare consumable aluminum bronze welding electrode while said die base is in direct heat exchange relation with said circulating cooling liquid, and machining said die base and said deposited aluminum bronze to reduce the product to the finished die form and expose the working surface.

2. A method of surfacing a ferrous article with aluminum bronze having a Brinnell hardness rating of at least 300 which comprises circulating a cooling liquid in direct heat exchange relation with said ferrous article and depositing said aluminum bronze on said article by an inert gas shielded metal arc welding process using a bare consumable aluminum bronze welding electrode while said article is maintained in direct heat exchange relation with said circulating cooling liquid.

References Cited in the file of this patent

UNITED STATES PATENTS

| | | |
|---|---|---|
| 1,516,471 | Stoody | Nov. 18, 1924 |
| 1,550,651 | Charter | Aug. 18, 1925 |
| 1,640,443 | Devers | Aug. 30, 1927 |
| 1,717,530 | Thomson | June 18, 1929 |
| 2,250,561 | Wissler | July 29, 1941 |
| 2,277,654 | Merlub | Mar. 24, 1942 |
| 2,295,702 | Wissler | Sept. 15, 1942 |
| 2,299,747 | Harter | Oct. 27, 1942 |
| 2,504,868 | Muller | Apr. 18, 1950 |